(12) United States Patent
Hull et al.

(10) Patent No.: US 11,918,030 B2
(45) Date of Patent: Mar. 5, 2024

(54) VESSEL SCREEN RETAINING SYSTEM AND METHOD

(71) Applicant: Philip Morris USA Inc., Richmond, VA (US)

(72) Inventors: Nathaniel Hull, Richmond, VA (US); Adam Lisbeth, Richmond, VA (US); William Sammler, Richmond, VA (US); John Tilley, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 88 days.

(21) Appl. No.: 17/547,514

(22) Filed: Dec. 10, 2021

(65) Prior Publication Data
US 2022/0167657 A1    Jun. 2, 2022

Related U.S. Application Data

(62) Division of application No. 15/695,956, filed on Sep. 5, 2017, now Pat. No. 11,284,642.

(51) Int. Cl.
*A24B 3/18*    (2006.01)
*B01D 24/12*    (2006.01)
(Continued)

(52) U.S. Cl.
CPC .............. *A24B 3/182* (2013.01); *A24B 3/185* (2013.01); *B01D 24/12* (2013.01); *B01D 24/44* (2013.01);
(Continued)

(58) Field of Classification Search
CPC .......... A24B 3/182; A24B 3/185; A24B 13/00; B01D 24/12; B01D 24/44; B01D 24/4876;
(Continued)

(56) References Cited

U.S. PATENT DOCUMENTS 2,313,237 A    3/1943  Hois
2,334,448 A    11/1943 Sheridan
(Continued)

FOREIGN PATENT DOCUMENTS

| DE | 102007002427 A1 | 7/2008 | |
| EP | 2206860 A2 | 7/2010 | |
| EP | 2206860 A2 * | 7/2010 | ............... E05C 9/00 |

OTHER PUBLICATIONS

EP2206860A2 English description, Jul. 2010, Mattausch Juergen et al.*

(Continued)

*Primary Examiner* — Akash K Varma
(74) *Attorney, Agent, or Firm* — Harness, Dickey & Pierce, P.L.C.

(57) ABSTRACT

Certain embodiments include a screen assembly of a vessel, where the screen assembly includes a plurality of fixed elements and a retainer, and the retainer includes a ring, a plurality of wedges disposed about the ring, and a plurality of keyholes at spaced locations about the ring. Each keyhole includes a bore and a slot extending from the bore into an adjacent wedge of the plurality of wedges, the slots have a width less than the bores, and the retainer may receive the fixed elements through the bores and may be rotated in a relation with the plurality of fixed elements to bring the plurality of fixed elements into simultaneous engagement with the wedges.

18 Claims, 10 Drawing Sheets

(51) Int. Cl.
  *B01D 24/44* (2006.01)
  *B01D 24/48* (2006.01)
  *B01D 29/03* (2006.01)
  *B01D 29/94* (2006.01)
  *B01D 29/96* (2006.01)
  *A24B 13/00* (2006.01)

(52) U.S. Cl.
  CPC ......... *B01D 24/4876* (2013.01); *B01D 29/03* (2013.01); *B01D 29/94* (2013.01); *B01D 29/96* (2013.01); *A24B 13/00* (2013.01); *B01D 2201/0423* (2013.01); *B01D 2201/40* (2013.01); *B01D 2201/4015* (2013.01); *B01D 2201/4023* (2013.01); *B01D 2201/4053* (2013.01); *B01D 2201/4084* (2013.01)

(58) Field of Classification Search
  CPC ........ B01D 29/03; B01D 29/94; B01D 29/96; B01D 2201/0423; B01D 2201/40; B01D 2201/4015; B01D 2201/4023; B01D 2201/4053; B01D 2201/4084
  USPC ........................................................ 210/232
  See application file for complete search history.

(56) References Cited

U.S. PATENT DOCUMENTS

| | | |
|---|---|---|
| 2,545,577 A | 3/1951 | Griffin |
| 3,817,259 A | 6/1974 | Strasser et al. |
| 4,165,618 A | 8/1979 | Tyree, Jr. |
| 4,270,553 A | 6/1981 | Conrad et al. |
| 4,312,369 A * | 1/1982 | Mullen, III ............ A24B 3/185 62/54.3 |
| 4,340,073 A * | 7/1982 | de la Burde ........... A24B 3/185 131/296 |
| 4,413,848 A | 11/1983 | Leaver et al. |
| 4,477,347 A | 10/1984 | Sylva |
| 5,653,869 A | 8/1997 | Evangelisti |
| 5,711,319 A | 1/1998 | Cumner |
| 5,779,812 A * | 7/1998 | Thies .................. A47L 15/4204 134/104.4 |
| 5,810,016 A | 9/1998 | Okumoto |
| 2016/0073682 A1 | 3/2016 | Barber et al. |

OTHER PUBLICATIONS

International Search Report and Written Opinion for corresponding Application No. PCT/US2018/048763 dated Nov. 22, 2018.

\* cited by examiner

VESSEL SCREEN RETAINING SYSTEM AND METHOD

CROSS-REFERENCE TO RELATED APPLICATIONS

This is a divisional of, and claims priority under 35 U.S.C. § 120 to, U.S. application Ser. No. 15/695,956, filed Sep. 5, 2017, the entire content of which is hereby incorporated by reference.

FIELD

This disclosure relates generally to a vessel used in processing a product, and more particularly, to a screen retaining system in such vessel for securely holding a mesh screen in a manner that provides a seal and facilitates change of the screen.

ENVIRONMENT

The use of liquid cryogens for processing of products has benefited from the availability of cryogens, such as, for example, liquid forms of nitrogen, oxygen, argon, hydrogen, helium, methane, Freon, refrigerants, carbon monoxide, carbon dioxide, etc. Liquid carbon dioxide may be employed as an expansion agent in the expansion of tobacco. Examples of processes and apparatuses for expanding tobacco are described in U.S. Pat. No. 4,340,073 to de la Burde et al., which is incorporated herein by reference in its entirety. Methods and apparatuses for treating a product, including food or tobacco, with a liquid cryogen are also described in U.S. Pat. No. 4,165,618 to Lewis Tyree, Jr., which is incorporated herein by reference in their entireties.

In an example working environment of certain embodiments of the present disclosure, a pressure vessel or chamber is utilized to process tobacco at desired pressures. The vessel may comprise a pivotally hinged, upper lid through which the product can be introduced into the vessel by a gravity feed and a pivotally hinged bottom door (lower lid) that opens to allow a discharge of the processed product with the assistance of gravity. Upon loading of the tobacco and closure of the vessel, liquid carbon dioxide is introduced into the vessel and brought into contact with the tobacco, whereby the tobacco is impregnated with carbon dioxide. Excess liquid is removed (drained) from the vessel through a screen and the carbon dioxide contained in the tobacco may be converted to solid carbon dioxide therein.

U.S. Pat. No. 4,312,369 to Mullen III et al., proposes a structure that is attached to the vessel door which includes a metal grating or the like capable of supporting a load tobacco (e.g., 750 pounds of tobacco) and a wire mesh screen which may be attached to a grating as by clamping the screen at its periphery by a flat ring that is bolted to the bottom door thereby compressing the portions of the screen between the ring and grating.

It may be desirable to replace and/or service the screen regularly so as to address any build-up of material on the screen and thus assure proper functioning of the screen and to prevent damage that might result if tobacco material were allowed to enter the piping system that transfers the carbon dioxide to and fro the vessel. Preventative maintenance may require change of the screen at least several times a week, if not on a daily basis.

Furthermore, as each fresh screen is installed, it may be beneficial for the fresh screen to be properly aligned, seated and sealed on a repeated basis so as to prevent tobacco material from entering the piping.

However, in systems wherein bolted connections are utilized to clamp a screen such as proposed in the aforementioned patent to Mullen III et al, repeated bathing of the bolt connections with a cryogenic agent (liquid carbon dioxide) may have a tendency to degrade the connection, particularly the bolts, hex nuts and other threaded components. As the threaded fasteners become ineffective, the clamping force may be reduced which in turn may increase tobacco leakage about the screen and contamination of the piping system.

Furthermore, fasteners such as described in U.S. Pat. No. 4,312,369 to Mullen III et al., require the operator to loosen, disconnect, reconnect and retighten each of a host of threaded connections, which operations are major contributors in machine downtime during a screen change. In addition the multiplicity of parts presents risk that a part may be accidentally dropped (or find its way) into system components downstream of the impregnator, such as a declumper and/or expansion tower, which situation imposes additional downtime to retrieve the errant part. Also the multiplicity of parts creates a risk that the screen may not be properly aligned nor sufficiently clamped at certain locations about the screen which situation presents a further risk of tobacco leaking into the piping system.

Accordingly, arrangements and methods to facilitate a change of filter screens of a processing vessel are desired in a manner that assures proper sealing and minimizes downtime.

Arrangements and methods to facilitate change of filter screens which minimizes or avoids certain loose parts of fasteners are also desired.

Arrangements and methods to facilitate change of filter screens which aids with sealing upon installation of replacement screens, are also desired.

SUMMARY

An aspect of certain embodiments of the disclosure provides a screen assembly of a vessel, comprising a screen provided with an arrangement of keyholes, a grate affixable to a lid of a treatment vessel, a plurality of axially extending lugs in a fixed relation with the grate and arranged consistent with the arrangement of keyholes of the screen, whereby the plurality of axially extending lugs cooperate with the keyholes of the screen to register placement of a first side of the screen adjacent the grate, a retainer provided with an arrangement of keyholes consistent with the arrangement of keyholes of the screen, whereby the plurality of axially extending lugs cooperate with the keyholes of the retainer to register placement of the retainer adjacent a second side of the screen, the retainer being provided further with one or more wedges adjacent to one or more of the keyholes of the retainer, and wherein each keyhole of the retainer with an adjacent wedge includes a slot, and the slot extends into the adjacent wedge, and wherein the retainer is rotatable to simultaneously engage all of the one or more wedges with one or more of the plurality of lugs, whereby the screen is clamped between the retainer and the grate when the one or more wedges are so engaged, and whereby the screen and the retainer are removable from the grate upon disengagement of the one or more wedges by counter rotation of the retainer.

In some embodiments, the rotation of the retainer may include rotationally displacing the plurality of wedges into engagement with the plurality of lugs simultaneously and guiding the rotation by sliding a stem portion of each of the plurality lugs along a respective one of the slots. Each wedge may comprise an inclined portion and a plateau portion, and the simultaneous engagement of the plurality of lugs with the plurality of wedges including a sliding engagement of the inclined portion of the respective wedge with a leading edge portion of a lug head of the respective lug.

In additional embodiments, the simultaneous engagement may further comprise contacting an underside of each lug head with the plateau portion of the respective engaged wedge. Upon a full rotation of the retainer at least one of the stem portions may engage an end portion of a respective slot of the retainer to register position of the plurality of lug heads with the plateau portions of the plurality of wedges.

In further embodiments, the keyholes of the screen are each provided with a circumferentially directed slot, whereby the screen is rotatable relative to the respective lugs.

The plurality of axially extending lugs may include a truncated master lug and at least one of the screen and the retainer may include a truncated master slot having a corresponding relation with the truncated master lug.

In some embodiments, the plurality of lugs are fixedly supported from the grate and/or the plurality of lugs engage the plurality of wedges with a lug head. The lug head may have a diameter greater than a stem portion of the respective lug.

The rotational direction of the screen may be opposite of a direction of the rotation of the retainer, whereby the keyholes of the screen are superposed by hole-free portions of the retainer.

In further embodiments, the screen assembly may further comprise an arrangement to arrest rotation of the screen during rotation of the retainer. The arresting arrangement may comprise a removable key.

It is also envisioned that the retainer may further comprise a handle arranged to facilitate manual rotation of the retainer and that the screen assembly may further comprise an anti-rotational assembly operative with at least one of the lugs to lock the retainer against rotation.

In some embodiments, the anti-rotational assembly may comprise an axial extension of at least one of the plurality of lugs, an L-shaped bracket comprising a first arm with an aperture capable of slidingly receiving the axial extension and a second arm configured to locate against a backside of a respective wedge upon the axial extension being received by the aperture. The anti-rotational assembly may further comprises a removable locking pin extending through the axial extension at a location adjacent the first arm when the axial extension is fully received through the aperture.

Alternatively, the anti-rotational assembly may comprise an axial extension of at least one of the plurality of lugs, with the axial extension including a radially directed aperture, and a removable locking pin extendable through the radial aperture and through an aperture located along a rim of the retainer at a location adjacent a wedge that cooperates with the lug with the axial extension In further embodiments, the pattern of keyholes of the screen may coincide with a ring of the grate and/or the arrangement of the lugs may coincide with a ring provided on the grate and/or the arrangement of the lugs may coincide with mutually concentric first and second rings provided on the grate and/or the pattern of keyholes of the screen may coincide with a ring provided on the screen and/or the pattern of keyholes of the screen may coincide with mutually concentric first and second rings provided on the screen and/or the retainer may comprise a ring, with the pattern of keyholes of the retainer coinciding with the ring of the retainer and/or the pattern of keyholes of the retainer may coincide with mutually concentric first and second rings of the retainer.

In further embodiments, the screen may comprise a disc of mesh sandwiched between plates, and the plates may include first and second ring sections and perforated sections discrete from the first and second ring sections of the screen. The grate may comprise first and second rings and a cross-hatched structure discrete from the first and second rings of the grate.

In some embodiments, the retainer may comprise an inner ring and an outer ring and radial supports extending therebetween and the rings of the grate, the screen and the retainer may coincide when the screen assembly is fully assembled.

In some embodiments, the plurality of axially extending lugs may include a master lug which may have a shape different from the other lugs and/or the keyholes of the screen may include a master keyhole which may have a shape which may differ from the other keyholes of the screen and/or the master lug may cooperate with the master keyhole to register placement of the first side of the screen adjacent the grate. In further embodiments, the keyholes of the retainer may include a master keyhole with a shape that may differ from the other keyholes of the retainer and/or the master lug may cooperate with the master keyhole to register placement of the retainer adjacent the second side of the screen.

Another aspect of certain embodiments of the present disclosure provides a screen assembly of an impregnator vessel comprising a plurality of fixed elements, a retainer comprising a ring, a plurality of wedges disposed about the ring, and a plurality of keyholes at spaced locations about the ring, with each keyhole comprising a bore and an slot extending from the bore into an adjacent wedge of the plurality of wedges, the slots having a width less than the bores, whereby the retainer may receive the fixed elements through the bores and may be rotated in a relation with the plurality of fixed elements to bring the plurality of fixed elements into simultaneous engagement with the wedges.

In embodiments, the ring of the retainer includes an outer ring and an inner ring and the retainer may further comprise a pair of handles supported from the inner ring.

In further embodiments, the screen assembly may further comprise a screen comprising a screen disc body comprising a mesh which may be interposed between first and second plates with each of the first and second plates including a ring superposable with the ring of the retainer and a perforated section adjacent the ring of the plate, and a pattern of apertures at spaced locations about the rings of the plates, with the apertures being arranged to receive the fixed elements with clearance.

In some embodiments, the screen may further comprise a plurality of slots extending from each of the plurality of apertures such that the screen may be rotated relative to the received fixed elements. The screen assembly may further comprise a lid, the lid comprising a lid body, a grate fixedly supported from the lid body, wherein the plurality of fixed elements may axially extend from grate.

Another aspect of certain embodiments of the present disclosure provides a method of changing a screen of a screen assembly of a treatment vessel, comprising placing a first side of a screen adjacent a grate, placing a retainer adjacent an opposite side of the screen, releasably clamping the screen between the grate and the retainer by extending a plurality of lugs through the screen and the retainer during the placement of the screen and the retainer, rotating the retainer until the plurality lugs simultaneously engage a plurality of wedges disposed about the retainer, whereby the screen is clamped between the retainer and the grate when the plurality of lugs are engaged; and whereby the screen and the retainer are removable from the grate upon simultaneous disengagement of the plurality of lugs from the plurality wedges by counter rotation of the retainer.

In some embodiments, the retainer may include a plurality of keyholes and the extension of the plurality of lugs through the retainer may include extending the plurality lugs through the keyholes of the retainer. The rotation of the retainer may include rotationally displacing the plurality of wedges into engagement with the plurality of lugs simultaneously and guiding the rotation by sliding a stem portion of each of the plurality lugs along a slot extending from each of the keyholes to a location along each of the wedges.

In further embodiments, each wedge may comprise an inclined portion and a plateau portion and the simultaneous engagement of the plurality of lugs with the plurality of wedges may include a sliding engagement of the inclined portion with a leading edge portion of a lug head of each of the plurality of lugs. The screen may include a plurality of keyholes so that the extension of the plurality of lugs through the screen may include extending the lugs through the keyholes of the screen.

In further embodiments, the method may further comprise rotating the screen to slide stem portions of the plurality of lugs along a plurality of slots provided in the screen, each of the plurality of slots extending from a respective one of the keyholes of the screen, whereby the screen is guidedly rotated in a first rotational direction. The rotational direction of the screen may be opposite of a direction of the rotation of the retainer, whereby the keyholes of the retainer are closed by portions of the screen. The lug head may have a diameter greater than a stem portion of the respective lug.

Another aspect of the present disclosure provides a method of improving operational efficiency of an impregnator vessel, comprising modifying the impregnator vessel to include a quick-change screen assembly comprising a retainer, a screen and a grate, whereby a replacement of the screen comprises opening an end portion of the impregnator vessel to expose the quick-change screen assembly, removing the retainer from the exposed quick-change screen assembly by rotating the retainer in a first direction relative to a plurality of fixed elements such that the rotation of the retainer simultaneously releases the fixed elements from a plurality of biasing catches, with the rotation including moving the retainer into a position where the plurality of fixed elements are aligned with a first plurality of keyholes, the rotation further including guiding the rotation by slidingly engaging the plurality of elongate elements along a first plurality of slots which extend from the plurality of biasing catches to the first plurality of keyholes; and freeing the retainer from the fixed elements and a remainder of the exposed quick-change screen assembly by withdrawing the retainer axially while the fixed elements are aligned with the first plurality of keyholes, and releasing the screen of the exposed screen assembly by aligning a second plurality of keyholes with the fixed elements and withdrawing the screen axially away from the grate while the fixed elements are aligned with the second plurality of keyholes.

In some embodiments, the method may further comprise replacing the released screen with a fresh screen, the replacement including axially moving the fresh screen into a position adjacent the grate while aligning the fixed elements with a plurality of keyholes of the replacement screen, re-attaching the retainer by aligning the first plurality of keyholes of the retainer with the fixed elements, axially moving the retainer into a superposing relation with the replacement screen, and simultaneously engaging the plurality of fixed elements with the plurality of biasing catches by rotating the retainer.

The releasing the screen may include rotating the screen in a second direction relative to the plurality of fixed elements while guiding the rotation by slidingly engaging the plurality of fixed elements along a second plurality of slots which extend from each of the second plurality of keyholes.

BRIEF DESCRIPTION OF THE DRAWINGS

The forms disclosed herein are illustrated by way of example, and not by way of limitation, in the figures of the accompanying drawing and in which like reference numerals refer to similar elements and in which.

DETAILED DESCRIPTION

Figure 1:
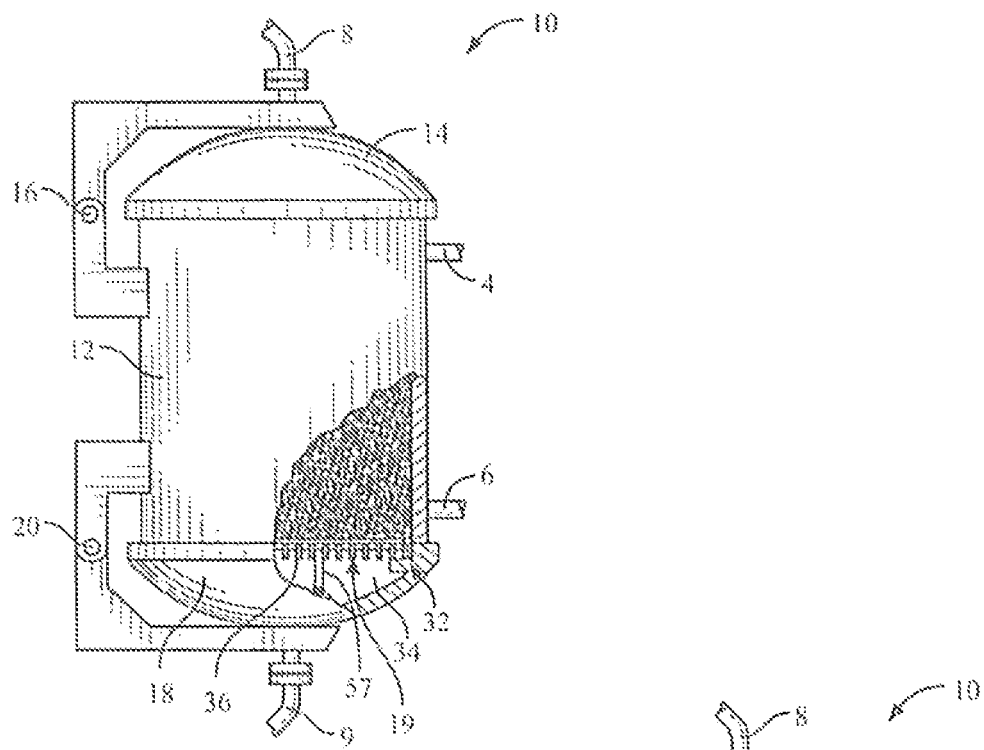
FIG. 1 is a side planar view of an example of a vessel comprising a screen retaining system constructed in accordance with an embodiment of the present disclosure, wherein the view is partially broken a way to show portions of an example of the screen retaining system at the lower vessel door and product in the vessel for processing.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Figure 2:
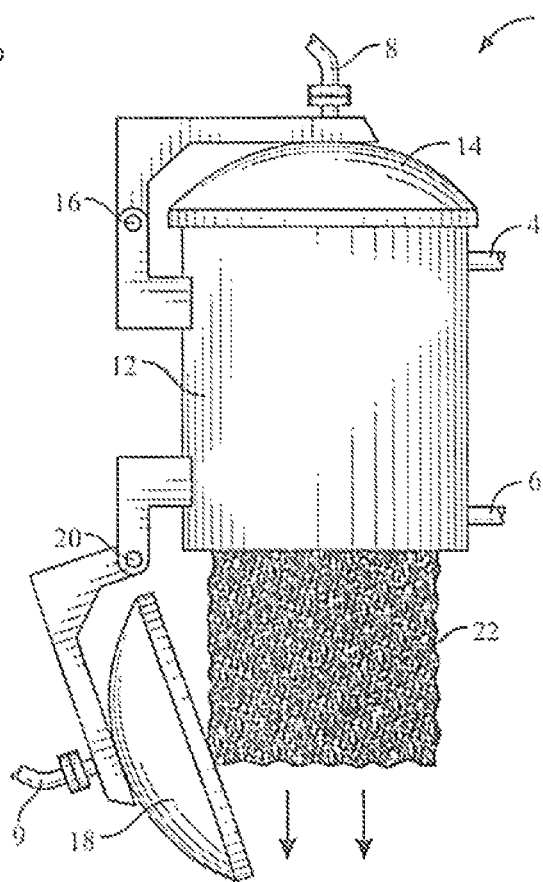
FIG. 2 is a side planar view of the vessel of FIG. 1 showing the lower vessel door being opened and the processed product being discharged from the vessel, according to an embodiment.

Referring to FIGS. 1 and 2 of the drawing, an embodiment of the present disclosure provides a vessel 10, which may be in some embodiments a pressure vessel of the type used for processing a product such as tobacco or food or other product with a liquid cryogen. In an embodiment, the vessel 10 may be of a type used for expanding tobacco wherein the tobacco may be impregnated with liquid carbon dioxide while in the vessel 10. Thereafter, the treated tobacco may be withdrawn from the vessel 10 and may be subjected to further processing such as a rapid heating at atmospheric pressure through an expansion tower, such that solid carbon dioxide within the tobacco is vaporized and the tobacco is expanded.

In some embodiments of the present disclosure, the pressure vessel 10 may include a chamber 12 that may be fitted with an upper lid 14 that may pivot about a hinge 16 such that the lid 14 can be opened to permit supply of product to be processed, such as by, for example, a gravity feed from a conveyor (not shown) or the like. The treatment chamber 12 may be sized to accept, for example, a load of tobacco. The weight of the load of tobacco may vary in various embodiments. For example, a load of about 500 pounds may be used, or a load of about 750 pounds of tobacco may be used, or a load of about 800 pounds of tobacco may be used, etc. Smaller or larger loads may be used in various embodiments. The tobacco is known to have pores into which a liquid carbon dioxide can penetrate. Upon placement of the tobacco within the chamber 12, the upper lid may be closed and clamped shut to provide a pressure-tight enclosure within which treatment may proceed.

Referring now to FIG. 2, upon completion of the treatment, the processed tobacco 22 may contain solid carbon dioxide and may have coagulated into a coherent mass or may comprise a number of relatively large chunks of tobacco. To release the processed tobacco 22, the door (lower lid) 18 may be unlatched and pivoted about the lower hinge 20 such that the door 18 may be retracted and the processed tobacco 22 may be withdrawn from the vessel 10 with the assistance of gravity or other suitable arrangement.

In certain embodiments, the vessel 10 may be further provided with ported connections 4 and 6 near the top and bottom of the chamber 12, respectively, as well as lines 8 and 9 through the lid 14 and the bottom door 18, respectively. These connections and lines may allow for purging the interior of the chamber 12 with a gaseous medium, such as gaseous carbon dioxide and introducing and removing liquid carbon dioxide. The liquid carbon dioxide may be introduced and/or withdrawn, for example, through line 9 that may pass through the bottom door 18. All of the connections and outlets may be suitably closed to permit the pressure in the chamber 10 to be brought up to desired processing levels.

Figure 3:
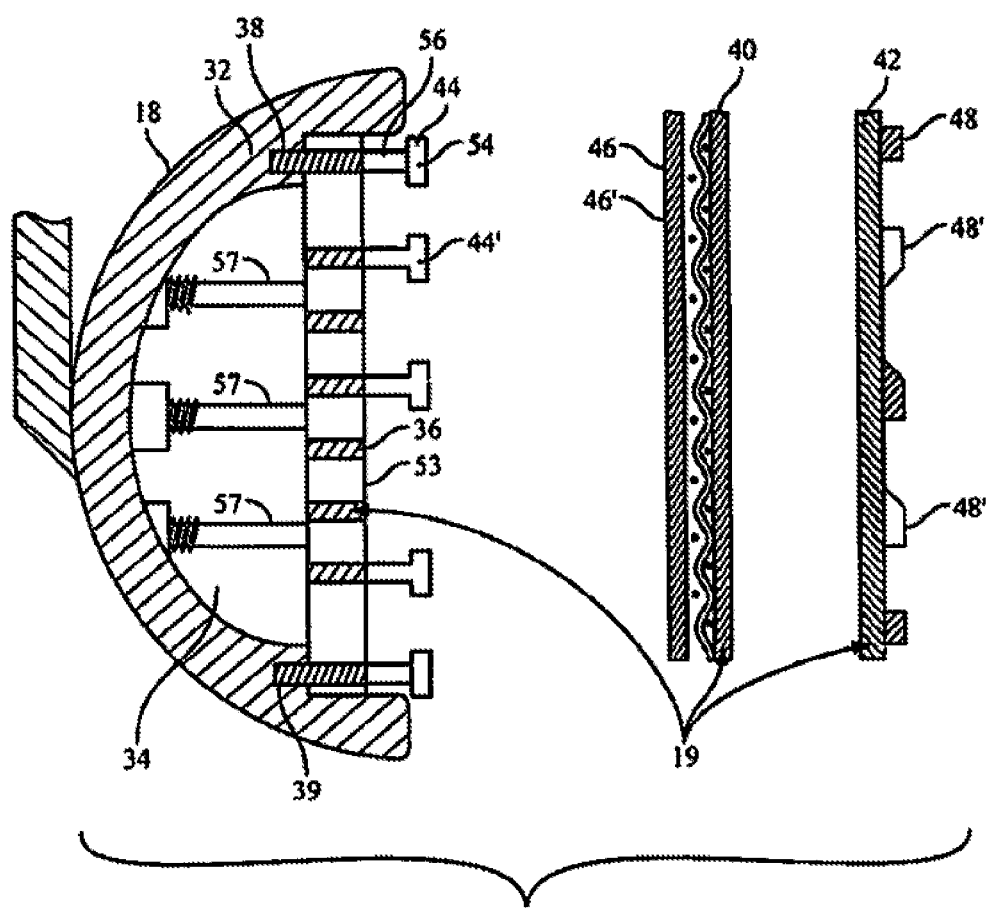
FIG. 3 is an exploded, cross-sectional view of the screen retaining system, together with the lid of the lower vessel door of the vessel and screen retaining system shown in FIG. 1, according to an embodiment.

Referring now to FIGS. 1 and 3, in accordance with an embodiment of the present disclosure, the lower lid (door) 18 may be provided with a screen assembly 19 for supporting the load of tobacco in the chamber 12. The screen assembly 19 may be capable of permitting gaseous and/or liquid carbon dioxide to pass therethrough for contacting the tobacco and/or draining liquid carbon dioxide from the vessel 10 without entraining bits of tobacco. In accordance with an embodiment of the present disclosure, the screen assembly 19 may comprise a plurality of components including a grating (grate) 36, a screen 40 and a retainer 42, wherein the screen 40 may be self-supporting unit and the grate 36 may be fixedly attachable to an interior of the door 18. In addition, in certain embodiments, the screen 40 and the retainer 42 may be releaseably attachable to and alignable with the grate 36 via a plurality of lugs 44, 44' extending orthogonally from the grate 36 (see also FIG. 4B), which may cooperate with a plurality of apertures (or keyholes) 46, 46' that are provided in the screen 40 (see also FIG. 5A) and a plurality of slotted, biasing wedges 48,48' that are provided with the retainer 42 (see also FIGS. 6A, 6B, 10A, 10B).

The chamber 12 of the pressure vessel 10 may be cylindrical, and the hinged lid 14 and door 18 each may have a circular surface at the interface with the walls of the chamber 12. In such embodiments, the grate 36, filter screen 40 and the retainer 42 are generally in the form of circular discs. It is contemplated that the teachings herein may be applied to other cross-sectional forms of the chamber 12, in which case the lids and the components of the screen assembly 19 disclosed herein may be provided with a different, conforming form.

In certain embodiments, the door 18 may comprise a dome shaped outer wall 32 that defines an inner space 34 within the door 18. Traversing this space 34 is the grating (grate) 36 of metal or other suitable materials capable of supporting loads of tobacco. The grating 36 may be mounted on an inwardly extending shoulder 38 of the door 18, which may be integrally formed with the wall 32 (as shown) or formed as a discrete ring-shaped piece that is attached to the wall 32. The shoulder 38 may extend completely around the door 18 or may be a number of pedestals disposed intermittently, and possibly equidistantly, around the inner periphery of the wall 32. Bolts 39 or other suitable connectors may fixedly secure the grating 36 to the shoulder 38. The bolts 39 may comprise an extended form of a lug 44.

Figure 4A:
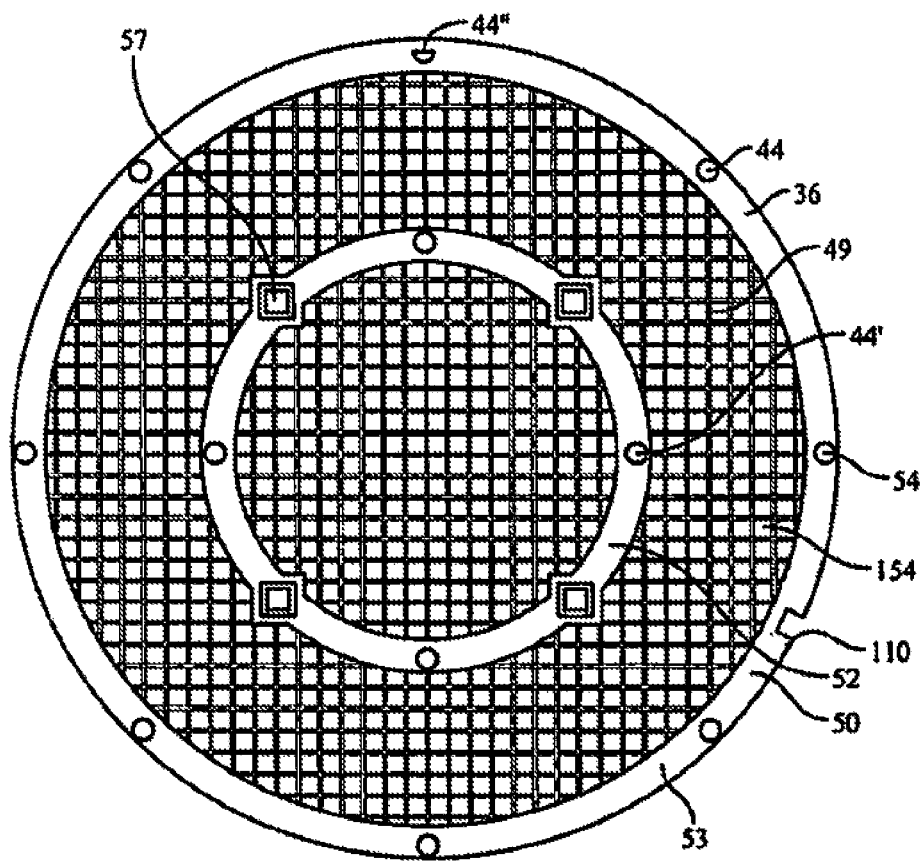
FIG. 4A is a planar frontal view of an grate component of the screen retaining system shown in FIG. 1, according to an embodiment.
Figure 4B:
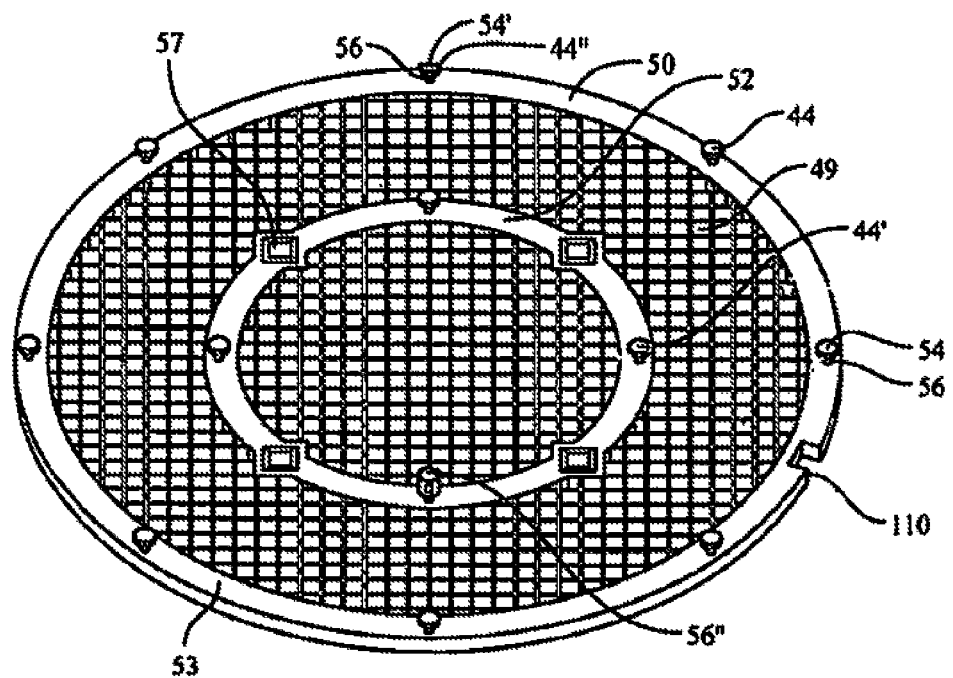
FIG. 4B is a perspective view of the grate component shown in FIG. 4A, according to an embodiment.

Referring now to FIGS. 4A and 4B, according to an embodiment, the grating (grate) 36 may comprise a disc-shaped, cross-hatched, grating body 49, which may be superposed by or integrally formed with an outer ringed section 50 and an inner ring section 52. In one or more embodiments, the outer ring section 50 and the inner ring section 52 may be concentrically disposed on the side 53 of the grate 36 facing the chamber 12 (when the door 18 is closed). The openings 154 of the disc-shaped, cross-hatched, grating body 49 may be sized to facilitate the flow of fluid such as liquid or gas carbon dioxide or other agent through the grating body 49. In one or more embodiments, the outer ring section 50 is disposed about the outer periphery of the grate 36. In some embodiments, the inner and outer ring sections 50, 52 on the chamber side 53 of the grate 36 may be provided with a smooth or polished surface so as to promote sealing with the screen 40 once the screen 40 is in place and the screen assembly 19 has been fully closed (engaged).

Still referring to FIGS. 4A and 4B, the outer ring section 50 and the inner ring section 52 on the chamber side 53 of the grating 36 may each be provided with a plurality of "T" shaped, locking and alignment lugs 44, 44', respectively, which extend orthogonally (axially) toward the chamber 12 when the door 18 is closed. In some embodiments, the lugs 44, 44' may be disposed about the ring sections 50, 52 in a symmetrical pattern. In other embodiments the lugs 44, 44' may be disposed in asymmetrical patterns or other arrangements where a pattern is not used. Optionally, the locking and alignment lugs 44, 44' may include one or more lugs 44, 44' that is/are asymmetrical to an otherwise symmetrical pattern of other lugs 44, 44' so that the screen 40 may be positioned against the grating 36 according to, for example, only a single, desired orientation (in the sense of one side or the other or in a rotational sense). In some embodiments, the threaded ends of the locking and alignment lugs 44 located about the outer ring section 50 may be used to secure the outer periphery of the grating 36 against the shoulder 38 of the lid 18.

Referring now to FIGS. 3, 4A and 4B, in some embodiments, connection between the grating 36 and the lid 18 may be secured with a plurality of bolts 57 extending from spaced locations about the inner ring section 52 of the grating 36 to a corresponding portion of the lid 18.

Locking and alignment lugs 44, 44' may comprise a lug head 54 and a stem 56 fixedly attached to the grating 36 by a threaded connection or other suitable arrangement such as a brazed joint, weld or the like (including, for example, being integrally formed as part of the grating 36), such that the lugs 44, 44' remain in place even after repeated changes of screen 40. Differently shaped lugs 44 and 44' may also be used. In an embodiment, the outer ring section 50 may include eight (8) locking and alignment lugs 44 at spaced locations symmetrically about the outer ring section 50 and the inner ring section 52 may include four (4) locking and alignment lugs 44' at spaced locations symmetrically about the inner ring section 52. The number of locking and alignment lugs 44, 44' may be of a lesser number or greater number as deemed necessary for achieving the purposes disclosed herein, or as may be desired, and different symmetrical or asymmetrical arrangements may be used.

In an example embodiment as shown, the inner ring section 52 may be provided with locking and alignment lugs 44' at its 12 o'clock, 3 o'clock, 6 o'clock and 9 o'clock positions and the outer ring section 50 may be provided with locking and alignment lugs 44 at those same respective positions (and additional ones in between). Other arrangements may be used, including arrangements where lugs 44 are not placed in any of the same respective positions as alignment lugs 44'.

In certain embodiments, the overall diameter of the grating 36 may be about 1.13 meter, and the width of the outer ring sections 50 may be selected such that it may cover the shoulder 38 of the lid 18. Other dimensions may be used.

Figure 5A:
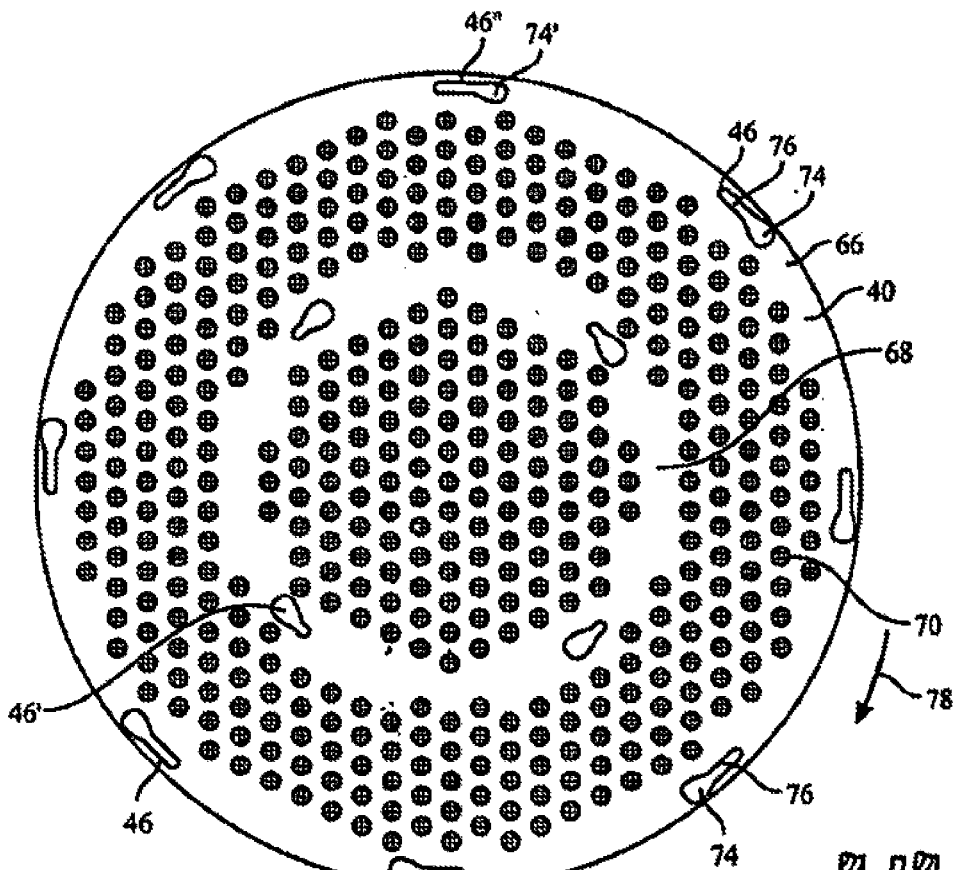
FIG. 5A is a planar frontal view of a screen component of the screen retaining system shown in FIG. 1, according to an embodiment.
Figure 5C:
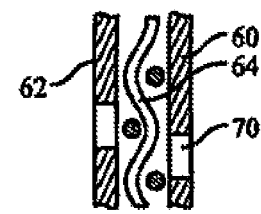
FIG. 5C is a cross-sectional detail edge view of the screen component shown in FIG. 5A, according to an embodiment.
Figure 5B:
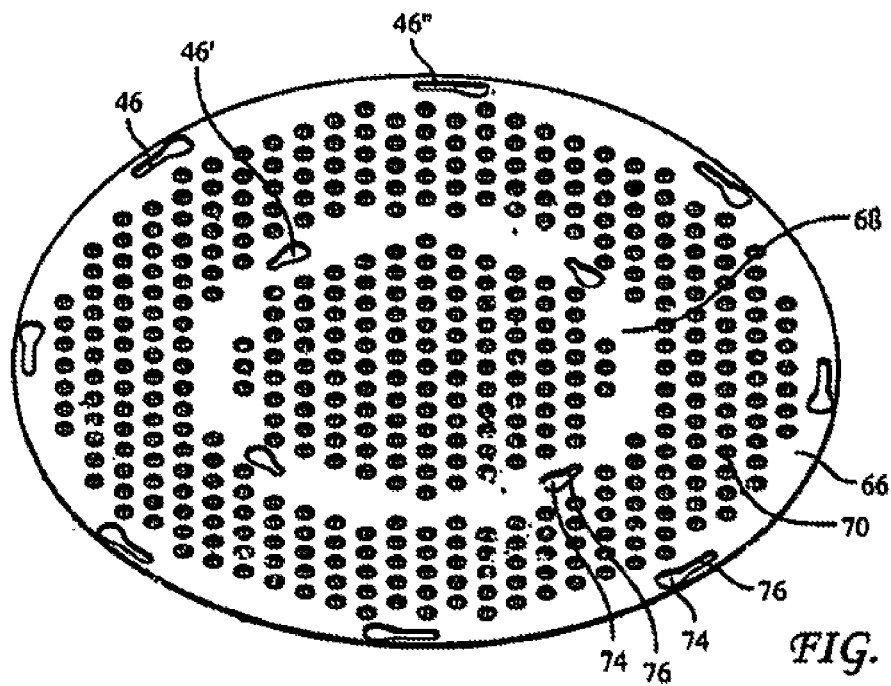
FIG. 5B is a perspective view of the screen component shown in FIG. 5A, according to an embodiment.

Referring now to FIGS. 5A and 5C, in certain embodiments, the screen 40 may comprise an inner perforated plate 60 (on the side of the screen 40 closest to chamber 12 when the door 18 is closed), an outer perforated plate 62 and a body of mesh material 64 or other suitable filtering material interposed between the plates 60 and 62. In some embodiments, the mesh material 64 may comprise a wire mesh, and/or may comprise other suitable filtering materials such as metallic gauze or screen or the like. During the construction of the filter screen 40, the perforated plates 60, 62 may be pressed together and may be, for example, tack welded at a plurality of locations. Other configurations for a screen 40 may be used, including a screen 40 with only one plate instead of two plates, or a screen 40 with more than two plates, or a screen with one plate and mesh combined, etc.

In certain embodiments, said one or more plates may include an outer ring section 66 and an inner ring section 68, which may correspond in radial location and radial extent as with the outer and inner ring sections 50, 52 of the grating 36, respectively, such that upon positioning of the screen 40 within the screen assembly 19, the outer and inner ring sections 66, 68 of the screen 40 may bear against and slide against the outer and inner rings sections 50, 52 of the grating 36, respectively. In order to facilitate such bearing and sliding action, the outer and inner ring sections 66, 68 of the filter 40 may be provided with smooth and/or polished surfaces, which arrangement also promotes establishment of a tobacco tight seal between the grating 36 and the screen 40 along the outer and inner ring sections 66, 68 and 50, 52, respectively, once the retainer 42 has been fully rotated into place.

In some embodiments, said one or more plates of a screen 40 may be perforated with a plurality of circular holes 70 (other shapes may be used), which may be sized to allow the plate or plates to enclose and support a mesh material 64 and yet allow fluids to pass through the screen 40. The circular holes 70 may have a diameter, for example, of about one-half inch or greater (smaller sizes may also be used). The size, placement and the number of the circular holes 70 may assist with support from the grating 36 and establishment of fluid passages through both the filter 40 and the grating 36. In some embodiments, the outer and inner ring sections 66, 68 of the filter 40 may be without perforations other than the apertures (keyholes) 46, 46' as shown, but in other embodiments perforations 70 may also exist in said outer and/or inner rings.

The outer and inner ring sections 66, 68 may be provided with a plurality of keyholes 46, 46', respectfully, which may include in certain embodiments a larger, circular portion 74 and a narrower slot portion 76. In various embodiments, at least some or all of the larger, circular portion 74 may be sized to receive with clearance the lug heads 54 disposed about the outer and inner ring sections 50, 52 of the grating 36, and at least some or all of the narrower slot portions 76 may be sized to slidingly receive the stems 56 of the lugs 44, 44' of the grating 36 (in certain embodiments, non-circular shapes may be used for portion 74, which would correspond to a non-circular-shaped lug head 54). In some embodiments, the keyholes 46, 46' extend entirely through the inner and outer plates 62, 60 and portions of the body of screen material 64. In certain embodiments, some or all of the slot portions 76 of the keyholes 46 that may be disposed about the outer ring 66 of the screen 40 may be longer than the corresponding slot portions 76 that may be disposed about the inner ring 68 thereof. In any event, the slotted portions 76 may be straight or instead, arcuate in conformity with the arcuate nature of the rings 66, 68.

In some embodiments, the keyholes 46, 46' may be arranged along the respective outer and inner ring sections 66, 68 of the screen 40 in a pattern which may correspond with the pattern of the locking and retaining lugs 44, 44' of the grating 36, respectively, such that upon placement of the screen 40 against the grating 36, the various lug heads 54 may be passed through the corresponding circular (or differently shaped) portions 74 of the screen 40 and thereupon the screen 40 may be rotated in the direction of arrow 78 in FIG. 5A. By such arrangement, an operator of the processing vessel 10 may mount a fresh filter screen 40, or the same filter after cleaning, upon the grating 36 in the manner described and thereafter release his/her grip upon the screen 40. Such arrangement may be configured to allow the operator to use both hands when proceeding to the next step in the assembly of the screen assembly 19, which may comprise a placement, a rotational registration and a locking of the retainer 42. Placement and rotation of the screen 40 and retainer 42 onto grate 36 may be done at different times, or at the same time. In certain embodiments, screen 40 and retainer 42 may be part of the same component, and in certain embodiments screen 40 and retainer 42 may be two separate components as shown.

It is contemplated that the teachings herein may be practiced with the apertures 46, 46' of the screen 40 to include only the portions 74 without a narrower slot portion 76, in which case the screen 40 may be aligned and retained upon the alignment locking lugs 44, 44' without rotation, and the retention may still allow the operator to release his/her grip upon the screen 40.

Figure 6A:
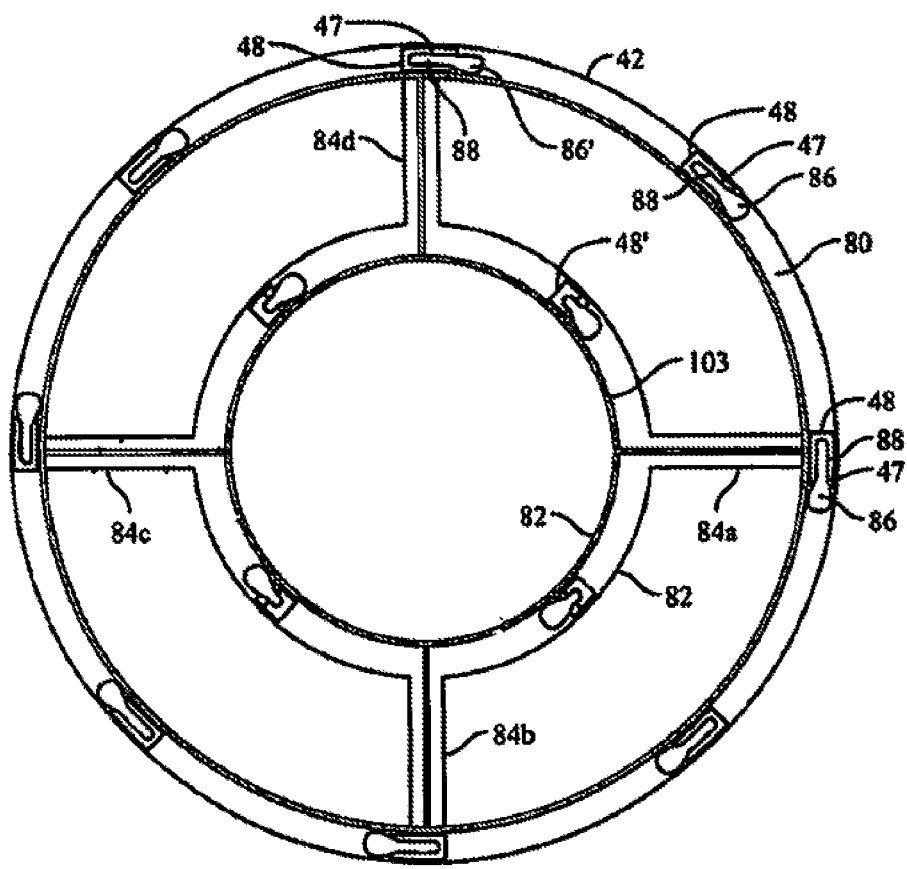
FIG. 6A is a planar frontal view of a retainer component of the screen retaining system shown in FIG. 1, according to an embodiment.
Figure 6B:
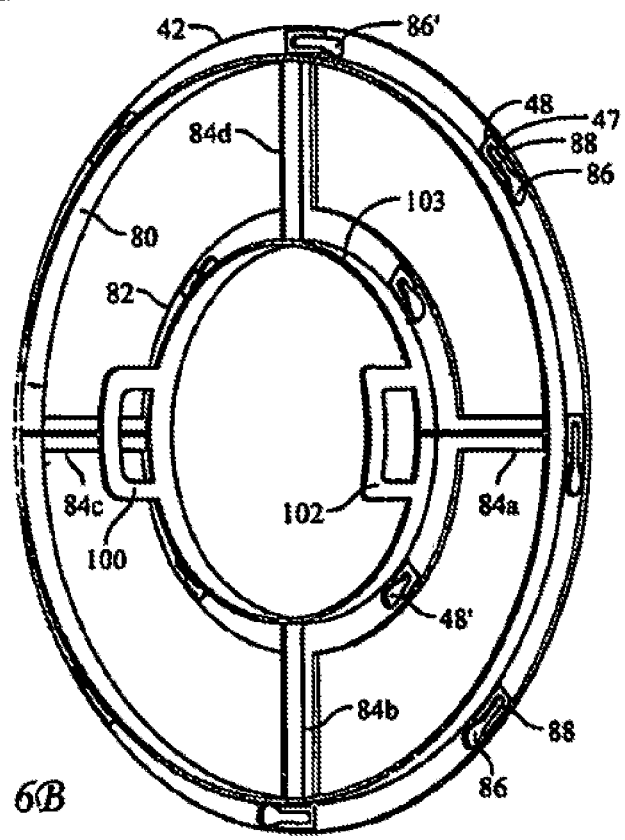
FIG. 6B is a perspective view of the retainer component shown in FIG. 6A, according to an embodiment.

Referring now to FIGS. 6A and 6B, in some embodiments, a retainer 42 may comprise a rigid outer ring 80, a rigid inner ring 82, a plurality of rigid, radially directed members 84a-d extending between the inner and outer rings 82, 80 (or even extending to the center), a plurality of keyholes 47, 47' at spaced locations about the outer and inner rings 80, 82, respectively, and a plurality of wedges 48, 48' at spaced locations about the outer and inner rings 80, 82, respectively. In certain embodiments, the keyholes 47, 47' of the retainer 42 may correspond in size, shape and position with the keyholes 46, 46' of the screen 40. Accordingly, some or all of the keyholes 47, 47' of the retainer 42 may include a larger, circular portion 86 that may be sized to receive lug heads 54 of the lugs 44, 44' of the grate 35 and a narrower slot portion 88 that may be sized to slidingly receive the stems 56 of the lugs 44, 44'. By such arrangement, the retainer 42 may be placed against a screen 40, which has been positioned against the grating 36 in a manner previously described. Thereupon the retainer may be guidedly rotated, with the lugs 44, 44' having been extended through the outer and inner rings 80, 82 through the keyholes 47, 47'. As mentioned above, in certain embodiments, the placement of screen 40 and retainer 42 onto grating 36 may also be done at the same time.

Figure 8:
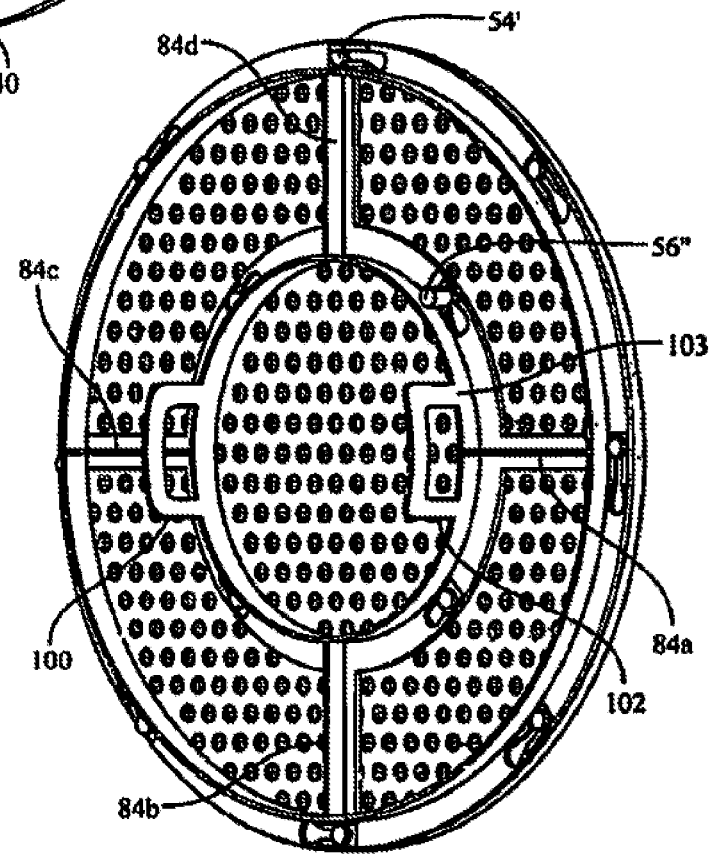
FIG. 8 is a perspective view of a screen assembly wherein an embodiment of a retainer has been rotated into position relative to and supported by a grate component of the screen retaining system shown in FIG. 1, according to an embodiment.
Figure 9:
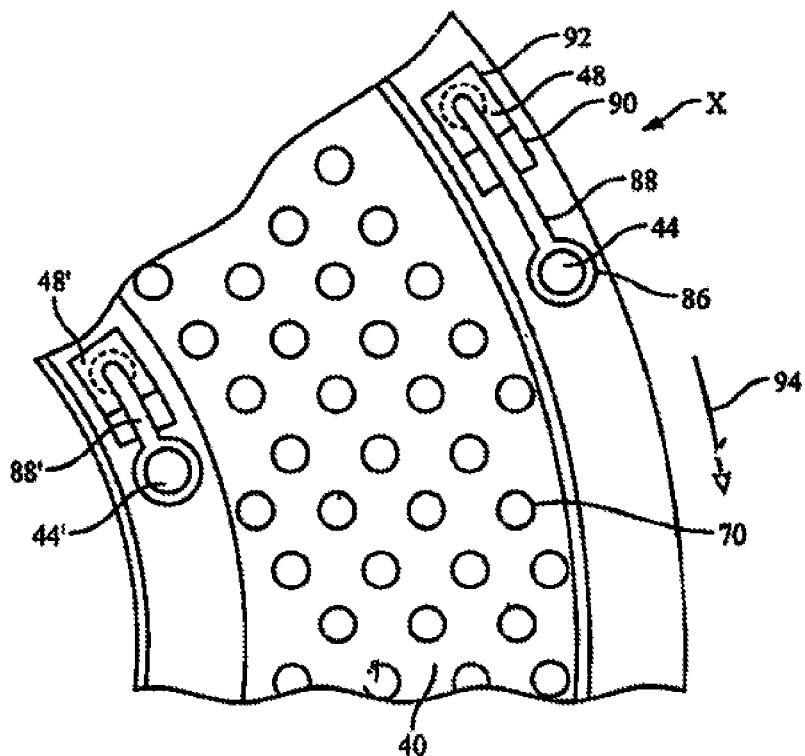
FIG. 9 is a detail, planar, top view of the screen assembly shown in FIG. 8, according to an embodiment.
Figure 10A:
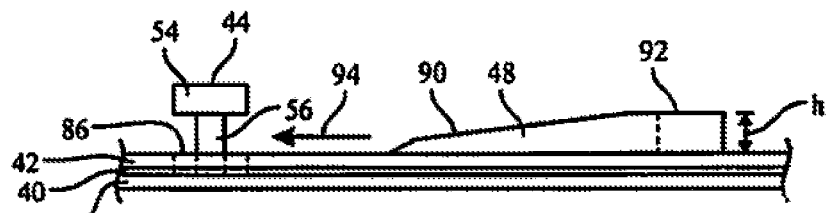
FIG. 10A is an edge view in the direction of arrow X in FIG. 9 prior to rotation of a retainer component, according to an embodiment.
Figure 10B:
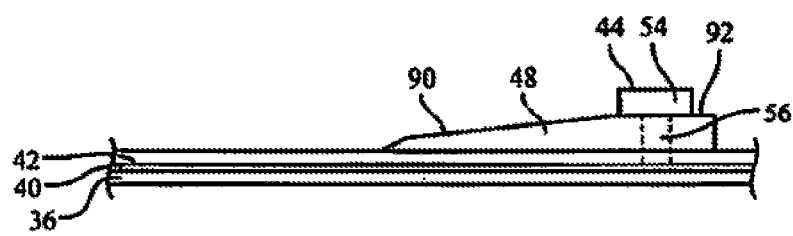
FIG. 10B is an edge view in the direction of arrow X in FIG. 9 after rotation of a retainer component into an engagement of the lugs of a grate component with the slotted wedges of the retainer component, according to an embodiment.

Referring now to FIGS. 9, 10A and 10B, in some embodiments, at least some or all of the wedges 48, 48' may comprise a leading inclined ramp portion 90 and a trailing plateau (level) portion 92 and the respective slot portion 88, 88' of an adjacent keyhole 47, 47' may extend into the respective wedge 48, 48' and terminate at the level portion 92 of the wedge. Referring particularly to FIGS. 10A and 10B, once the lug heads 54 of lugs 44, 44' have been extended through the portion 86 of the respective keyholes 47, 47', the retainer ring 42 may be rotated in the direction of arrow 94 such that one or more stems 56 of lugs 44, 44' guide the rotational movement of the retainer ring 42 and brings one or more of the lug heads 54 into engagement with the inclined portion 90 of the respective adjacent wedge 48. Upon further rotation of the retainer 42, for a particular lug 44, the stem 56 of the lug 44 may be urged against the inclined portion 90 of the respective wedge 48 until it approaches the terminus of the narrower slot portion 88 of the respective keyhole 47 where it may superpose and bear against the level portion 92 of the wedge 48 and be held in place. The level portion 92 of a wedge 48 may be given a height h such that placement of a lug head 54 adjacent the terminus of a slot 88 may compress the screen 40 between the retainer 42 and the grating 36. These may occur at one or more of the wedges in retainer 42 and corresponding lugs 44 and 44' of grate 36. Such compression or biasing action may be distributed about the ring sections 50, 52 of the grate 36, the ring section 66, 68 of the screen 40 and the rings 80, 82 of the retainer 42, which action may promote a tobacco tight seal about the screen 40. At this point, in certain embodiments the screen assembly 19 may be configured as shown in FIG. 8.

Figure 7:
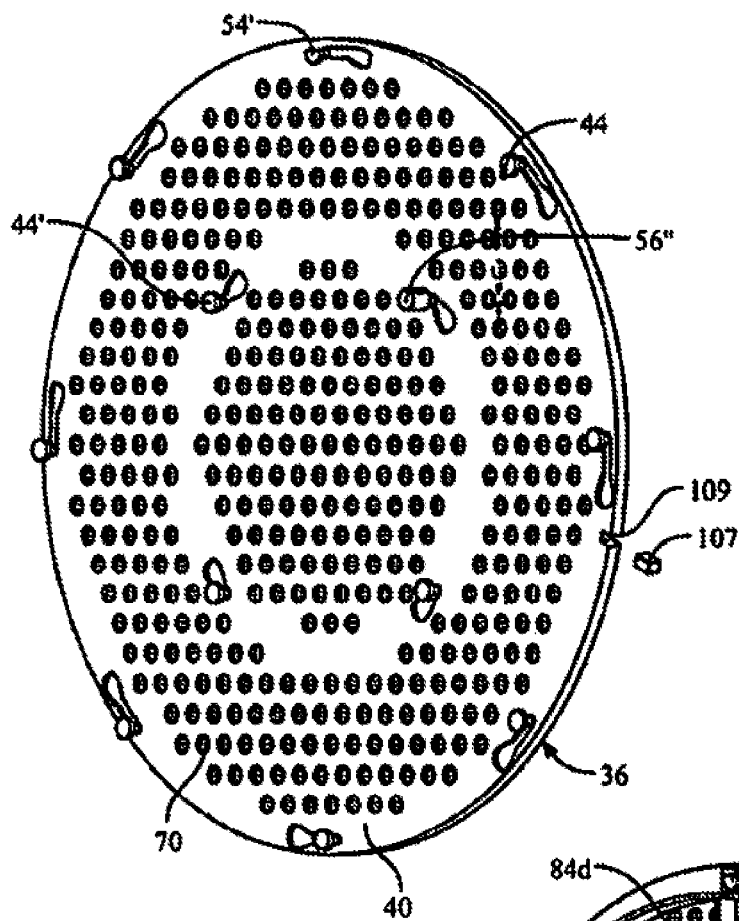
FIG. 7 is a perspective view of an example of an assembly wherein an embodiment of a screen component has been rotated into position relative to and supported by an embodiment of a grate component of the screen retaining system shown in FIG. 1, together with an optional arrangement to key the screen against rotation, according to an embodiment.

The aforementioned biasing action may be releasable by rotation of the retainer 42 in a reverse direction opposite of the direction of arrow 94 in FIG. 9. Upon further rotation of the retainer 42 with the guidance of the slot portion 88 and stem 56 of the lugs 44, 44', the retainer may arrive at a position relative to the circular portion 86 of the keyholes 47, 47' such that the retainer 42 may be lifted away from the remainder of the screen assembly 19 when initiating replacement of the screen 40. At this point, the remainder of the screen assembly may appear as shown in FIG. 7. It is noteworthy that at this point, the screen 40 may still be supported and retained upon the grating 36 so that the operator may temporarily remove the retainer 42 without concern for the screen 40 falling from the remainder of the assembly.

Likewise with the guidance of the slot portions 76 of the keyholes slots 46, 46' of the screen 40 allow the screen 42 to be rotated into a position relative to the circular portions 74 of the keyholes 46, 46' such that the screen may be lifted away from the grate 36 and a fresh screen 40 put in its place (the same screen 40 may also be used again after cleaning). In certain embodiments, screen 40 may be rotated at the same time that the retainer 42 is rotated, in which case both the retainer and the screen may be removed at the same time.

In reference to FIGS. 6B and 8, the retainer 42 may be provided with one or more handles, such as handles 100 and 102, to facilitate manual gripping of the retainer 42, rotation of the retainer 42 and/or removal of the retainer 42. In some embodiments, the handles 100 and 102 may extend from a reinforcing rim (flange) 103 provided about the inner ring 82 of the retainer 42.

Figure 11:
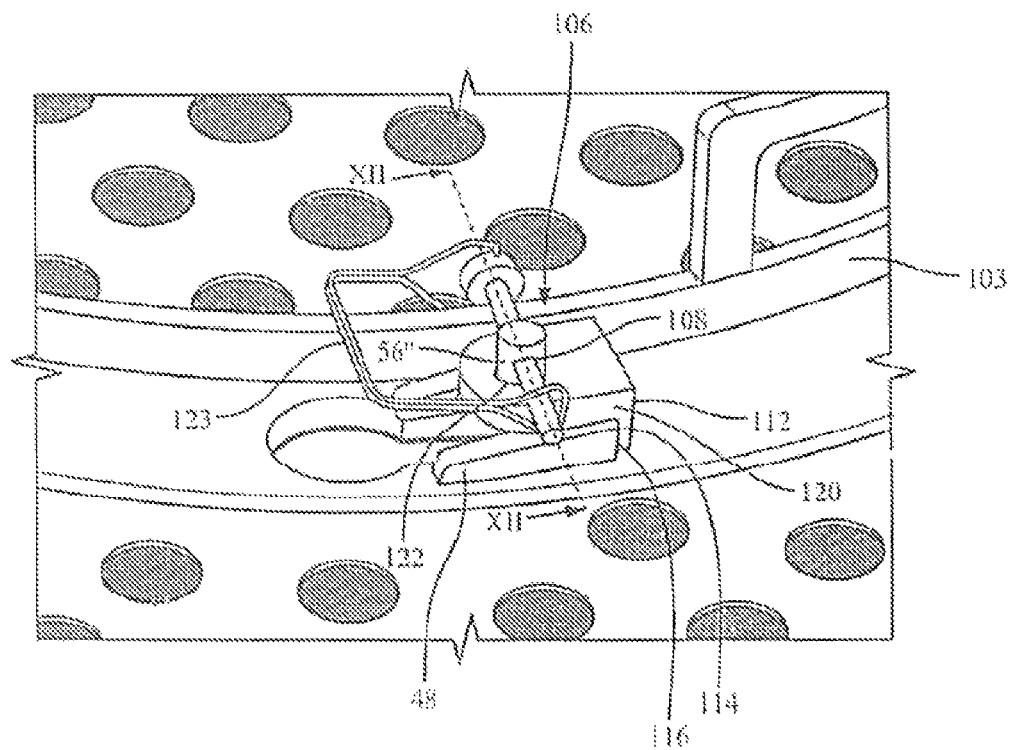
FIG. 11 is a perspective detail view of a locking device of the screen retaining system shown in FIG. 1, according to an embodiment.
Figure 12:
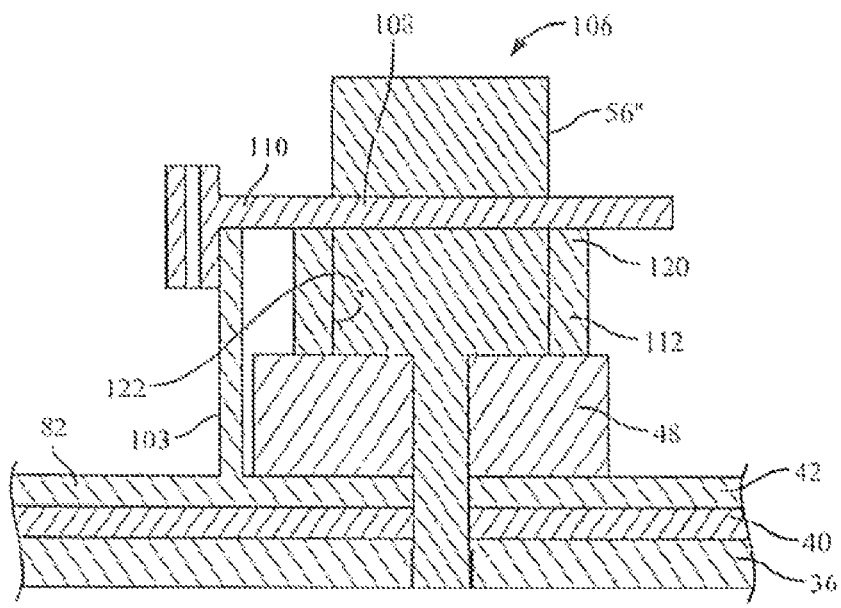
FIG. 12 is a cross-sectional view of the locking device shown in FIG. 11 but with the "D" ring removed, according to an embodiment.

Referring now to FIGS. 11 and 12, in some embodiments one or more of the wedges 48 may be coupled with an anti-rotational lock 106, which may comprise an extended lug head 56" which may be provided with a radially directed aperture 108, which may receive a pin 110. When in place, the pin 110 may retain an L-shaped bracket 112 comprising a vertical leg portion 114 that may place against a backside 116 of the respective wedge 48 and a horizontal leg portion 120 that may place atop the level portion 92 of the respective wedge 48. The horizontal leg portion 120 may include an aperture 122 which is sized to slidingly receive the extended lug head 56" as 112 is slid over lug head 56". A retainer clip 123 may be employed to prevent the pin 110 from withdrawing through the radial aperture 108 in the extended lug head 56". When in place, the anti-rotational lock 106 may prevent rotation of one or more of the various components of the screen assembly 19 during operations.

Figure 13:
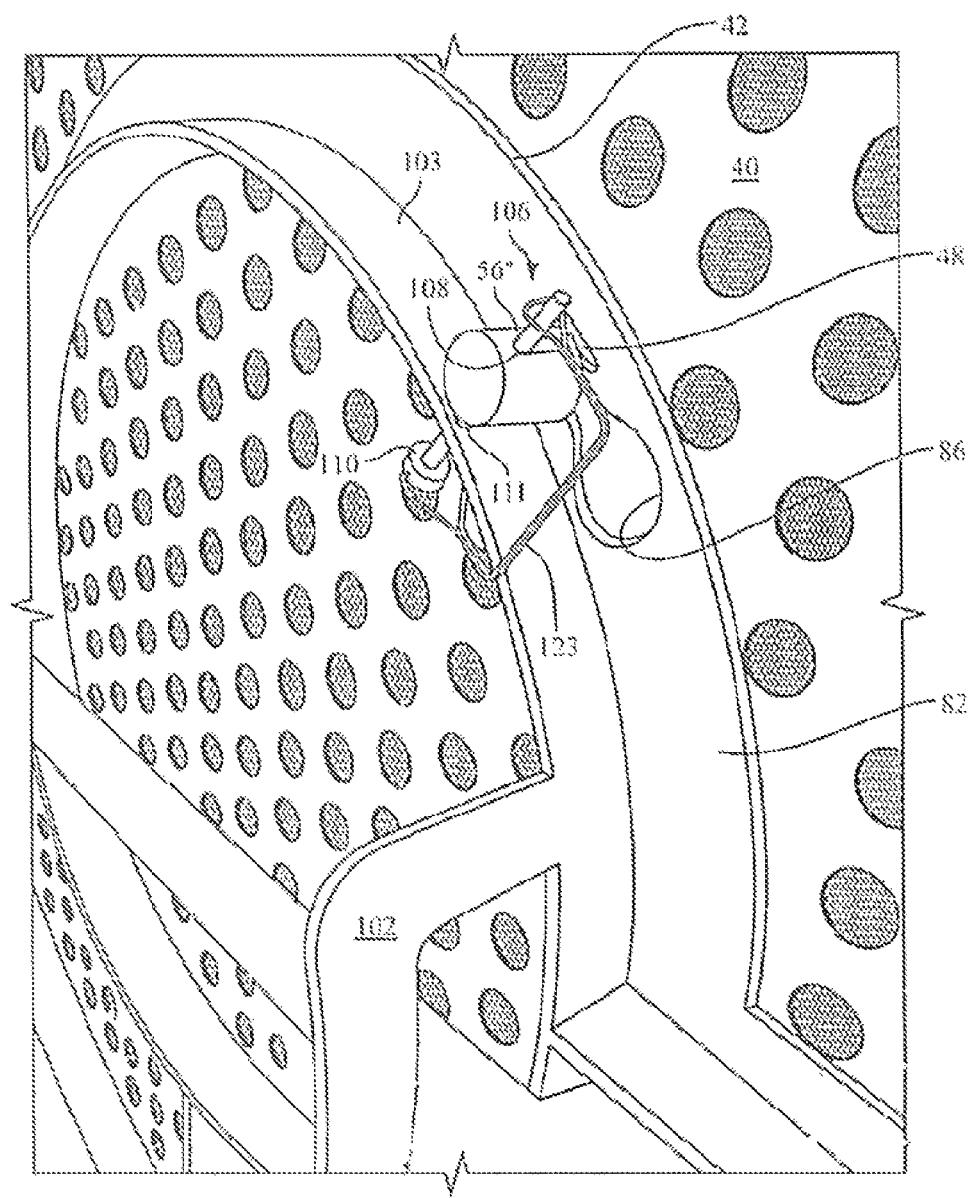
FIG. 13 is a perspective detail view of an alternate locking device of the screen retaining system shown in FIG. 1, according to an embodiment.

Referring now to FIG. 13, in another embodiment, the anti-rotational lock 106 may comprise an extended lug head 56" having a radially directed aperture 108, a pin 110 and an aperture 111 in the rim 103 of the inner ring 82 of the retainer 42 that may be aligned with one of the locking wedges 48 disposed along the inner ring 82 and which corresponds with the extended lug head 56". By such arrangement, the pin 110 may be inserted through both apertures 111 and 108 and retained in position with a retainer clip 123. Once in place, the pin 110 may prevent rotation of one or more of the various components of the screen assembly 19 during operations.

In describing certain embodiments, the various slots of the screen 40 and the retainer 42 were configured to allow rotation of those components in the same rotational direction. In certain arrangements, solid portions of the ring sections 50, 52 of the grating 36 may cover the otherwise exposed portions of the keyholes 47, 47' of the retainer and the keyholes 46, 46' of the screen 40. It may be desired in some embodiments to configure the keyholes and slots of the screen 40 and those of the retainer 42 such that the screen 40 and the retainer 42 may be rotatable in opposite directions. In the latter configuration, the exposed portions of the keyholes 47, 47' of the retainer 42 may be covered by solid portions (free of holes) of the ring sections 66, 68 of the screen 40. In essence, slots of the screen 40 and the retainer 42 may be pointed (directed) opposite of one another so that upon full engagement of the screen assembly 19, unslotted portions of one component cover the slots of the other.

Referring back to FIGS. 7, 4A and 4B, in some embodiments the screen assembly 19 may further comprise a key 107 and a notch 109 at a location along the edge of the screen 40, which may be positioned to align with a notch 110 provided at a corresponding location along the edge of grating 36 when the screen 40 is properly aligned with the grating 36. When inserted into the notches 109, 110, the key 107 may prevent rotation/displacement of the screen 40 as the retainer 42 is mounted upon the alignment and locking lugs 44, 44' and rotated into full engagement. Thereafter, the key 107 could be removed. It is contemplated that some embodiments will not use keying mechanisms or other suitable keying mechanisms may be employed instead of the one specifically shown in FIG. 7.

Figure 14A:
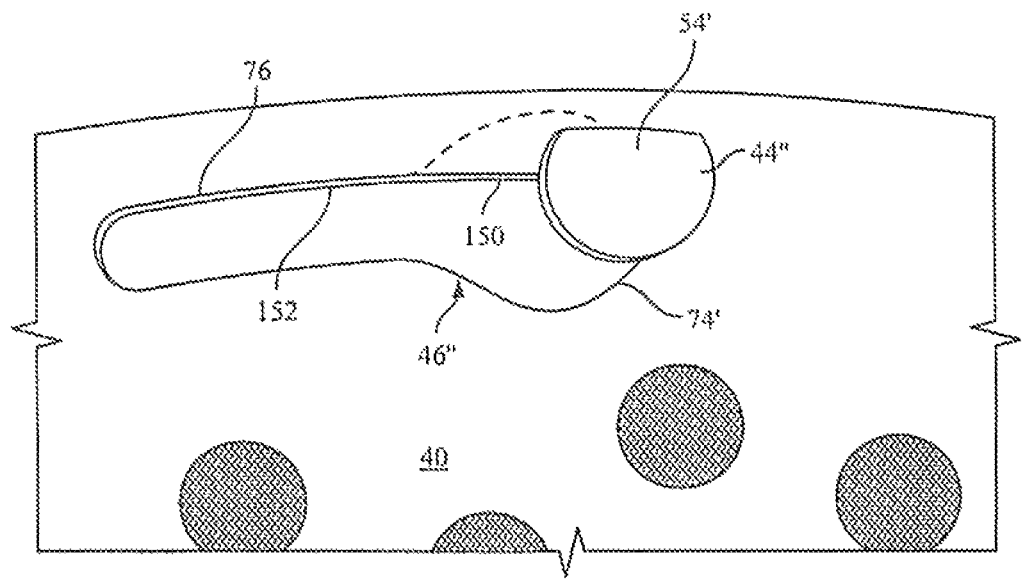
FIG. 14A is a detail view of a master slot and master lug, before rotation of the screen, according to an embodiment.
Figure 14B:
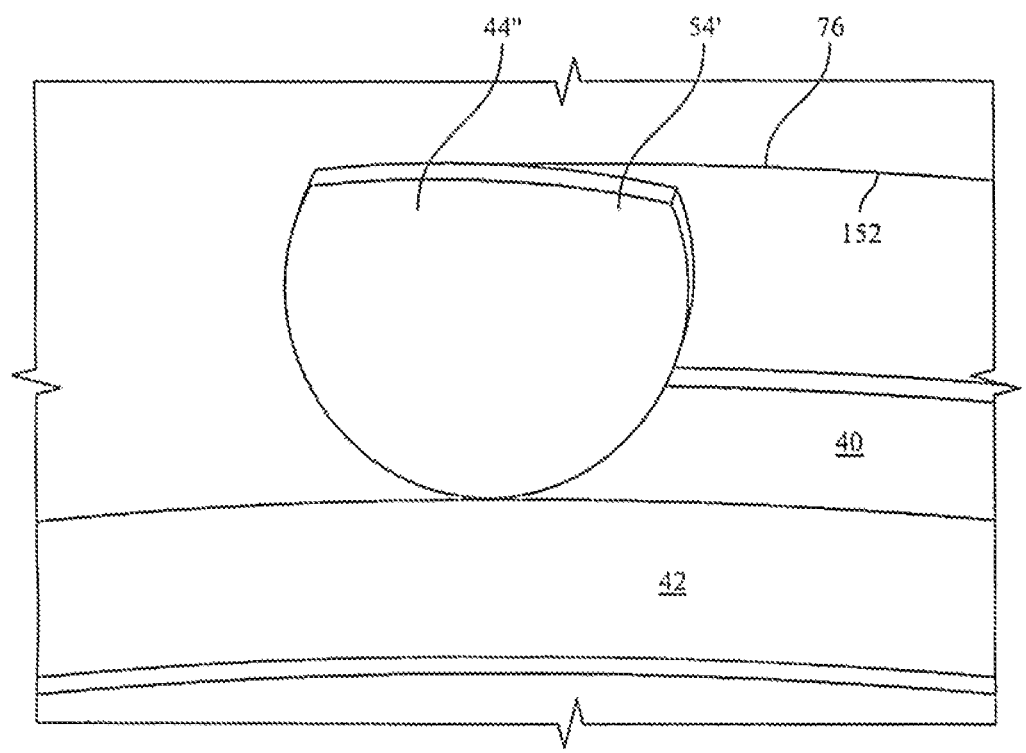
FIG. 14B is a detail view of the master slot and master lug shown in FIG. 14A, after rotation of the screen, according to an embodiment.

Referring now to FIGS. 14A and 14B, in some embodiments, the screen 40 may be provided with a master keyhole 46" that may include a truncated circular portion 74', wherein the upper edge 150 of truncated circular portion 74' may be, in effect, an extension of the radial outward edge 152 of the slot portion 76 of the master keyhole 46" (or any other shape that is different from the other keyholes may be used). In effect, the radially outward portion of a standard circular portion 74 may be filled in or never removed to produce the modified truncated circular portion 74'. The master keyhole 46" may be configured to cooperate with a master lug 44" which may comprise a truncated lug head 54' that is truncated in a manner corresponding to the truncation of the truncated circular portion 74'. In some embodiments, a single master lug 44" may be provided, for example, at a 12 o'clock position on the grating 36 (any other positions may be used). When the truncated master lug head 54' is inserted through the truncated circular portion 74' of master keyhole 46", the radially outward edge 150 of the truncated circular portion 74' of the screen 40 may assist in aligning the screen 40 relative to the grating 36. The cooperation between the truncated circular portion 74' of master keyhole 46" in the screen 40 and the truncated lug head 54' of master lug 44" in the grating 36 may facilitate proper initial placement of the screen 40 during screen replacement.

Likewise, in some embodiments, one of the slots of the retainer 42 may be provided with a truncated circular portion 86' (for example, at its 12 o'clock location such as shown in FIG. 6A) to cooperate in like manner with the truncated master lug head 54' of master lug 44".

Although the example embodiments have been described with regard to the lower lid (door) 18 of the vessel 12, the teachings are equally applicable to the upper lid 14 thereof and to other forms of vessels other than the one specifically disclosed herein.

It is also envisioned that the screen 40 and the retainer 42 may be constructed and configured in an integrated form.

With practices of the above teachings, changing of the screen 40 may be facilitated by the engagement of the lugs 44, 44' with the wedges 48, 48'. In certain embodiments, separate loosening and tightening of a plurality of discrete, threaded connectors may be avoided. Machine downtime during each change may be reduced and operational efficiency of the vessel may be enhanced.

PCT

Illustrative, non-exclusive examples of some embodiments of apparatus and methods are presented in the following enumerated paragraphs. It is within the scope of the present disclosure that an individual step of a method recited herein, including in the following enumerated paragraphs, may additionally or alternatively be referred to as a "step for" performing the recited action.

PCT 1. A screen assembly of a treatment vessel, comprising: a screen provided with an arrangement of keyholes; a grate affixable to a lid of a treatment vessel; a plurality of axially extending lugs in a fixed relation with the grate and mutually arranged consistent with the arrangement of key holes of the screen, whereby the plurality of axially extending lugs cooperate with the keyholes of the screen to register placement of a first side of the screen adjacent the grate; a retainer provided with a pattern of keyholes consistent with the arrangement of key holes of the screen, whereby the plurality of axially extending lugs cooperate with the keyholes of the retainer to register placement of the retainer adjacent a second side of the screen; the retainer provided further with a plurality of wedges disposed about the retainer consistent with the arrangement of key holes of the screen and a plurality of slots extending from each of the keyholes, of the retainer into an adjacent one of each of the plurality of wedges, the lugs and the slots mutually arranged such that the retainer is rotatable to engage the plurality of wedges with the plurality lugs; whereby the screen is clamped between the retainer and the grate when the plurality of lugs are engaged; and whereby the screen and the retainer are removable from the grate upon simultaneous disengagement of the plurality of lugs from the plurality wedges by counter rotation of the retainer.

PCT 2. The screen assembly of PCT 1, wherein the rotation of the retainer includes rotationally displacing the plurality of wedges into engagement with the plurality of lugs and guiding the rotation by sliding a stem portion of each of the plurality lugs along a respective one of the slots.

PCT 3. The screen assembly of PCT 1 or 2, wherein each wedge comprises an inclined portion and a plateau portion, the engagement of the plurality of lugs with the plurality of wedges including a sliding engagement of the inclined portion of the respective wedge with a leading edge portion of a lug head of the respective lug.

PCT 4. The screen assembly of PCT 3, wherein the engagement further comprises contacting an underside of each lug head with the plateau portion of the respective engaged wedge.

PCT 5. The screen assembly of PCT 4, wherein upon a full rotation of the retainer at least one of the stem portions engages an end portion of a respective slot of the retainer to register position of the plurality of lug heads with the plateau portions of the plurality of wedges.

PCT 6. The screen assembly of any of PCT of 1-5, wherein the keyholes of the screen are each provided with a circumferentially directed slot, whereby the screen is rotatable relative to the respective lugs.

PCT 7. The screen assembly of any of PCT 1-7, wherein the plurality of lugs are fixedly supported from the grate.

PCT 8. The screen assembly of PCT 6, wherein the rotational direction of the screen is opposite of a direction of the rotation of the retainer, whereby the keyholes of the screen are superposed by hole-free portions of the retainer.

PCT 9. The screen assembly of PCT 6, further comprising an arrangement to arrest rotation of the screen during rotation of the retainer.

PCT 10. The screen assembly of PCT 9, wherein the arresting arrangement comprises a removable key.

PCT 11. The screen assembly of any of PCT 1-10, wherein the retainer further comprises a handle arranged to facilitate manual rotation of the retainer.

PCT 12. The screen assembly of PCT 1, further comprising an anti-rotational assembly operative with at least one of the lugs to lock the retainer against rotation.

PCT 13. The screen assembly of any of PCT 1-12, wherein the arrangement of the lugs coincides with mutually concentric first and second rings provided on the grate; the arrangement of keyholes of the screen coincides with mutually concentric first and second rings provided on the screen; and the pattern of keyholes and wedges of the retainer coincides with mutually concentric first and second rings of the retainer.

PCT 14. The screen assembly of any of PCT 13, wherein the screen comprises a disc of mesh sandwiched between plates, the plates including first and second ring sections and perforated sections discrete from the first and second ring sections of the screen.

PCT 15. The screen assembly of any of PCT 1-14, wherein the plurality of axially extending lugs include a truncated master lug and at least one of the screen and the retainer includes a truncated master slot having a corresponding relation with the truncated master lug.

PCT 16. The screen assembly of any of PCT 1-15, wherein the retainer comprises an inner ring and an outer ring and radial supports extending therebetween.

PCT 17. A method of improving operational efficiency of an impregnator vessel, comprising: modifying the impregnator vessel to include a screen assembly comprising a retainer, a screen and a grate, whereby a replacement of the screen comprises: opening an end portion of the impregnator vessel to expose the screen assembly; removing the retainer from the exposed screen assembly by: rotating the retainer in a first direction relative to a plurality of fixed elements such that the rotation of the retainer releases the fixed elements from a plurality of biasing catches, the rotation including moving the retainer into a position where the plurality of fixed elements are aligned with a first plurality of keyholes; the rotation further including guiding the rotation by slidingly engaging the plurality of elongate elements along a first plurality of slots which extend from the plurality of biasing catches to the first plurality of keyholes; and freeing the retainer from the fixed elements and a remainder of the exposed screen assembly by withdrawing the retainer axially while the fixed elements are aligned with the first plurality of keyholes; and releasing the screen of the exposed screen assembly by aligning a second plurality of keyholes with the fixed elements and withdrawing the screen axially away from the grate while the fixed elements are aligned with the second plurality of keyholes.

PCT 18. The method of PCT 17, further comprising: replacing the released screen with a fresh screen, the replacement including axially moving the fresh screen into a position adjacent the grate while aligning the fixed elements with a plurality of keyholes of the replacement screen; re-attaching the retainer by aligning the first plurality of keyholes of the retainer with the fixed elements; axially moving the retainer into a superposing relation with the replacement screen; and engaging the plurality of fixed elements with the plurality of biasing catches by rotating the retainer.

PCT 19. The method of PCT 18, wherein the engagement of the biasing catches comprises rotationally displacing a plurality of wedges disposed about the retainer into engagement with a plurality of lugs of fixed relation to the grate, whereby the screen is clamped between the retainer and the grate when the plurality of lugs are engaged.

PCT 20. The method of PCT 19, wherein replacing the first screen includes rotating the fresh screen in a first direction the rotation opposite of the rotation of the retainer during the reattachment of the retainer, whereby the first plurality of keyholes and the first plurality of slots of the retainer are closed by portions of the screen.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A screen assembly of an impregnator vessel, the screen assembly comprising:
   a plurality of fixed elements; and
   a retainer including,
      an outer ring,
      an inner ring,
      a plurality of wedges disposed about the outer ring and the inner ring, and
      a plurality of keyholes at spaced locations about the outer ring and the inner ring,
      each keyhole comprising a bore and a slot extending from the bore into an adjacent wedge of the plurality of wedges, the slots having a width less than a width of the bores, whereby the retainer may receive the plurality of fixed elements through the bores and may be rotated in a relation with the plurality of fixed elements to bring the plurality of fixed elements into simultaneous engagement with the plurality of wedges.

2. The screen assembly of claim 1, wherein the retainer further comprises a pair of handles supported from the inner ring.

3. The screen assembly of claim 1, further comprising a screen, the screen comprising:
   a screen disc body comprising a mesh interposed between first and second plates;
   each of the first and second plates including a first ring and a second ring superposable with the outer ring and the inner ring of the retainer and a perforated section adjacent the first ring and the second ring of the first and second plates; and
   a plurality of apertures at spaced locations about the first ring and the second ring of the first and second plates, the plurality of apertures arranged to receive the plurality of fixed elements with clearance.

4. The screen assembly of claim 3, the screen further comprising a plurality of slots extending from each of the plurality of apertures such that the screen may be rotated relative to the received plurality of fixed elements.

5. The screen assembly of claim 1, further comprising a lid, the lid comprising a lid body, a grate fixedly supported from the lid body, wherein the plurality of fixed elements axially extending from the grate.

6. A method of changing a screen of a screen assembly of a treatment vessel, comprising:
   placing a first side of the screen adjacent a grate;
   placing a retainer adjacent an opposite side of the screen, the retainer including,
      an outer ring,
      an inner ring,
      a plurality of wedges disposed about the outer ring and the inner ring, and
      a plurality of keyholes at spaced locations about the outer ring and the inner ring; and
   releasably clamping the screen between the grate and the retainer, wherein releasably clamping the screen includes,
      extending a plurality of lugs through the screen and the plurality of keyholes of the retainer during the placing of the screen and the retainer, and
      rotating the retainer until the plurality of lugs simultaneously engage the plurality of wedges,
   wherein the screen is clamped between the retainer and the grate when the plurality of lugs are engaged, and
   wherein the screen and the retainer are removable from the grate upon simultaneous disengagement of the plurality of lugs from the plurality of wedges by counter rotation of the retainer.

7. The method of claim 6, wherein the rotation of the retainer includes rotationally displacing the plurality of wedges into engagement with the plurality of lugs simultaneously and guiding the rotation by sliding a stem portion of each of the plurality of lugs along a slot extending from each of the plurality of keyholes to a location along each of the plurality of wedges.

8. The method of claim 7, wherein each wedge comprises an inclined portion and a plateau portion, the simultaneous engagement of the plurality of lugs with the plurality of wedges including a sliding engagement of the inclined portion with a leading edge portion of a lug head of each of the plurality of lugs.

9. The method of claim 8, wherein the simultaneous engagement further comprises contacting an underside of each lug head with the plateau portion of each of the plurality of wedges.

10. The method of claim 6, wherein the screen includes a plurality of keyholes, the plurality of lugs extending through the plurality of keyholes of the screen.

11. The method of claim 10, further comprising rotating the screen to slide stem portions of the plurality of lugs along a plurality of slots provided in the screen, each of the plurality of slots extending from a respective one of the plurality of keyholes of the screen, whereby the screen is guidedly rotated in a first rotational direction.

12. The method of claim 11, wherein the first rotational direction of the screen is opposite of a direction of the rotation of the retainer, whereby the plurality of keyholes of the retainer are closed by portions of the screen.

13. The method of claim 11, further comprising arresting rotation of the screen during rotation of the retainer.

14. The method of claim 13, wherein the arresting comprises keying the screen against rotation during rotation of the retainer.

15. The method of claim 6, further comprising facilitating rotation of the retainer with a pair of handles.

16. The method of claim 6, further comprising locking the retainer against further rotation with an anti-rotational assembly operative upon at least one of the plurality of lugs.

17. The method of claim 6, wherein the plurality of lugs engage the plurality of wedges with a lug head.

18. The method of claim 17, wherein the lug head has a diameter greater than a stem portion of the plurality of lugs.

* * * * *